US012442780B2

(12) United States Patent
Hotoiu et al.

(10) Patent No.: US 12,442,780 B2
(45) Date of Patent: Oct. 14, 2025

(54) OFF LINE QUALITY CONTROL OF A BEAM SHAPING DEVICE FOR RADIATION THERAPY

(71) Applicants: Ion Beam Applications, Louvain-la-neuve (BE); The Trustees of the University of Pennsylvania, Philadelphia, PA (US)

(72) Inventors: Lucian Hotoiu, Brussels (BE); Rudi Labarbe, Boncelles (BE); François Vander Stappen, Brussels (BE); Julia Pakela, Philadelphia, PA (US); Boonkeng Kevin Teo, Wayne, PA (US); Wei Zou, Skillman, NJ (US)

(73) Assignee: ION BEAM APPLICATIONS, Louvain-la-Neuve (BE)

( * ) Notice: Subject to any disclaimer, the term of this patent is extended or adjusted under 35 U.S.C. 154(b) by 211 days.

(21) Appl. No.: 18/454,259

(22) Filed: Aug. 23, 2023

(65) Prior Publication Data

US 2024/0068963 A1    Feb. 29, 2024

(30) Foreign Application Priority Data

Aug. 24, 2022  (EP) ..................................... 22191888

(51) Int. Cl.
*G01N 23/046*    (2018.01)
*A61N 5/10*    (2006.01)
(Continued)

(52) U.S. Cl.
CPC ............. *G01N 23/046* (2013.01); *A61N 5/10* (2013.01); *A61N 5/103* (2013.01); *A61N 5/1071* (2013.01);
(Continued)

(58) Field of Classification Search
CPC ........ G01N 23/046; G01N 9/24; G01N 23/06; A61N 5/10; A61N 5/103; A61N 5/1071;
(Continued)

(56) References Cited

U.S. PATENT DOCUMENTS

| 7,031,434 B1 * | 4/2006 | Saunders | G21K 1/02 |
| | | | 378/150 |
| 2002/0085679 A1 * | 7/2002 | Zastrow | G21K 1/025 |
| | | | 378/150 |

FOREIGN PATENT DOCUMENTS

| CN | 105498099 A | 4/2016 |
| WO | WO 2017/216219 A1 | 12/2017 |

OTHER PUBLICATIONS

Myonggeon Yoon, et al., "Computerized tomography-based quality assurance tool for proton range compensators," Medical Physics, vol. 35, No. 8, 2008, pp. 3511-3517.
(Continued)

*Primary Examiner* — Kiho Kim
(74) *Attorney, Agent, or Firm* — Finnegan, Henderson, Parabow, Garrett & Dunner LLP

(57) ABSTRACT

A method for assessing a quality of a beam shaping device includes, establishing with a treatment planning system (TPS) the planned device design of the beam shaping device, manufacturing the beam shaping device according to the planned device design, establishing a CT-scan of the beam shaping device to yield an actual CT-image, determining dimensions and local materials densities from the actual CT-image, determining a calculated dose distribution in the treatment volume (V), and comparing the calculated dose distribution (cDD) with a reference dose distribution (rDD).

13 Claims, 4 Drawing Sheets

(51) Int. Cl.
*B33Y 80/00* (2015.01)
*G01N 9/24* (2006.01)
*G01N 23/06* (2018.01)

(52) U.S. Cl.
CPC .............. *B33Y 80/00* (2014.12); *G01N 9/24* (2013.01); *G01N 23/06* (2013.01); *A61N 2005/1095* (2013.01)

(58) Field of Classification Search
CPC .......... A61N 2005/1095; A61N 5/1075; A61N 5/1031; A61N 5/1039; A61N 5/1048; A61N 5/1065; A61N 5/1077; A61N 2005/1034; A61N 2005/1074; A61N 2005/1092; B33Y 80/00
See application file for complete search history.

(56) References Cited

OTHER PUBLICATIONS

Heng Li, et al., "A CT-based software tool for evaluating compensator quality in passively scattered Proton therapy," Physics in Medicine and Biology, vol. 55, No. 22, 2010, pp. 6759-6771.

Y. Zheng, "WE-E-BRB-07: Quality Assurance of Proton Range Compensators by CT Scanning", Medical Physics, vol. 36, Issue 6, Part 26, 2009, p. 2785.

Minkyu Kim, et al., "Development of a 3D optical scanning-based automatic quality assurance system for proton range compensators", Medical Physics, vol. 42, No. 2, (2015), pp. 1071-1079.

Seyjoon Park, et al., "Proton-radiography-based quality assurance of proton range compensator," Physics in Medicine and Biology, vol. 58, No. 18, 2013, pp. 6511-6523.

European Search Report in European Patent Application No. EP22191888.1, Feb. 3, 2023 (6 pages).

* cited by examiner

OFF LINE QUALITY CONTROL OF A BEAM SHAPING DEVICE FOR RADIATION THERAPY

CROSS-REFERENCE TO RELATED PATENT APPLICATIONS

This application claims priority to European Patent Application No. 22191888.1, filed on Aug. 24, 2022, which is hereby incorporated by reference in its entirety.

TECHNICAL FIELD

The present invention concerns a quality assessment (QA) method for ensuring that an actual beam shaping device has been satisfactorily manufactured according to a planned device design determined by a treatment planning system (TPS) for depositing a planned dose distribution (pDD) within a treatment volume comprising tumoural cells. The present method does not require access to a particle accelerating system. It is also advantageous in that, in many cases, it can identify potential geometrical or density defects of the actual beam shaping device responsible for a deviation from the planned dose distribution (pDD). These defects due to manufacturing can be corrected in subsequent manufacturing process improvements.

BACKGROUND OF THE INVENTION

Radiation therapy with particles or waves, such as electron beams, protons beams, heavy ions beams, x-rays, γ-rays, and the like, has become an essential tool for treating patients with tumours.

Since both tumoural cells and healthy cells comprised in a volume are irradiated, a first challenge in cancer treatment is to define a treatment plan ensuring that defined doses are deposited into the tumoural cells to effectively destroy or kill them, while limiting the doses deposition into healthy cells to spare them as much as possible. A second challenge is to actually deposit the defined doses into the tumoural cells whilst limited doses are actually deposited into the healthy cells as planned.

Different radiation modalities deposit their energies in different patterns. For example, Xrays deposit most of their energy near the level of the skin, and the deposited energy decreases with penetration depth into the tissues. Healthy tissues located upstream of a treatment volume of tumoural cells therefore receive a higher dose than the cells located in the treatment volume. By contrast, charged particle beams, such as protons and carbon ions, deposit most of their energy close to the end of their beam path, forming a so called Bragg peak.

The charged particles emerging from a nozzle of a particle accelerator form a narrow pencil beam. To cover a treatment volume of practical size, the pencil beam must be either scattered by a foil or scanned. Pencil beam scanning (PBS) and double scattering (DS) proton therapy are two techniques allowing physicians to deliver a precise, powerful dose of radiation that covers the tumour with minimal radiation exposure to healthy tissues. This can be achieved by shaping the beam(s) delivered towards the volume to be treated by means of beam shaping devices. A beam shaping device is a device positioned in the nozzle or fixed to the nozzle of the particle accelerator, between a source of accelerated particles and a treatment volume, changing the energy profile and/or the geometry of the beam.

Pencil beam scanning (PBS) is an active scanning technique consisting of steering PBS-beams (or beamlets) of charged particles along corresponding beam axes (Xi) towards individual spots of a matrix of spots defining the treatment volume comprising tumoral cells. Predefined target doses are thus deposited into cells covered by the individual spots. The PBS-beam is steered along the corresponding beam axes (Xi) and the dose deposition proceeds according to the treatment plan defining the doses (Dij) to be deposited into each cell covered by a given spot along a beam axis (Xi), as well as the scanning sequence of spots irradiation. PBS reduces unnecessary radiation exposure to surrounding non-cancerous cells by shaping the area being treated to mirror the tumour geometry. Beside the geometry of the target, PBS allows local tuning of the intensity of each PBS-beam to achieve the desired dose distribution within the target.

PBS is very advantageous because it optimizes the geometrical distribution of the dose deposition to match it with the geometry of the treatment volume (V) enclosing the tumour. PBS treatment time can, however, be long as the PBS-beam must scan over each spot (Sij) and over each energy layer (Tj). Moving the PBS-beam from a beam axis (Xi) to a different beam axis (X(i+1)) requires a time of a few ms. Changing the energy of a given PBS-beam parallel to a given beam axis (Xi) to deposit the desired doses (Dij) into the cells (Cij) of different layers (Tj) is more time consuming and is of the order of 500 ms. The number of layers (Tj) therefore has a strong influence on the duration of a treatment.

Saving treatment time reduces the operation time of a particle accelerator by each patient. It is also more comfortable for the patient. It is also advantageous if the treatment plan comprises FLASH irradiation, wherein doses are deposited into the cells at high dose rates (HDR), of at least 1 Gy/s or even up to at least 40 Gy/s. A given dose deposited at HDR has shown to spare healthy cells relative to the same dose deposited at lower conventional dose rates (CDR). Where FLASH irradiation is particularly interesting, is that a given dose deposited into tumoural cells has the same killing effect irrespective of whether it was deposited at HDR or at CDR.

Depositing the predefined doses (Dij) into a treatment volume by PBS can be achieved by using a ridge filter and PBS-beams of a single energy layer. A ridge filter requires the spots of each layer to be aligned along corresponding beam axes (Xi). Ridge filters comprising energy degrading units in the form of smooth-pins or step pyramids, or crests have been described in the art. For example, EP21208699 describes a ridge filter comprising a plurality of energy degrading units in the form of orifices or pins arranged side by-side according to the-array of spots in a support base. Each energy degrading unit is formed by one or more degrading subunits in the form of orifices or pins having a generalized cylindrical geometry of cross-sectional areas (Ai) and extending along the corresponding beam axis (Xi) from the-support block. The degrading subunits of a same energy degrading unit can for example be stacked on top of one another along the corresponding irradiation axis (Xi). The superposition of degrading subunits forming each energy degrading unit allows shaping and increasing the width of the Spread-Out Bragg Peak (SOBP) along the corresponding beam axis (Xi).

The principle of a ridge filter is that portions of a beam (100.$i$) of given energy oriented along a corresponding beam axis (Xi) pass through different material thicknesses of the filter, producing Bragg peaks with different ranges, whose superposition results in a homogeneous SOBP extending from an upstream boundary of the volume to a downstream boundary of the volume along the corresponding beam axis (Xi), spanning a whole depth of the treatment volume (V) along Xi. A ridge filter can integrate or can be combined with other beam shaping devices including a range shifter and a range compensator.

Double scattering proton therapy is a passive scattering technique wherein a broadbeam passes through a first scatterer which is uniform and yields a Gaussian beam profile on the second scatterer, which must be non-uniform in some way, modifying the Gaussian distribution as well as the beam energy. The beam shaping devices used in double scattering techniques include range compensators (to control the energy profile) and apertures (to control the shape of the irradiation cross section). In continuation, the term "beam" is used to refer to both PBS-beams (or beamlets) for PBS applications and broad beams for double scattering applications, unless specifically otherwise defined.

A CT-scan image of a patient is produced, which values are converted to proton stopping power. Planned device designs of one or more beam shaping devices are produced by a treatment planning system (TPS) which shapes the beam to mate a geometry of the treatment volume (V) comprising tumoral cells ($3t$), for depositing specific doses ($D_{ij}$) into specific locations within the treatment volume (V). A planned dose distribution (pDD) can thus be generated satisfying objectives on the dose deposition in the treatment volume and surrounding healthy tissues set by a physician.

The one or more beam shaping devices are manufactured according to the corresponding planned device design. Different techniques can be used, including machining, but today, 3Dprinting is advantageous in terms of cost effectiveness, rapidity and of—its capability to generate fine and complicated geometries, with a broad range of materials suitable for this technique.

Neither machining nor 3D printing, however, can guarantee to generate a beam shaping device exactly according to the planned device design. Several manufacturing errors can occur, which can include errors on the width and height of the towers or cavities of beam shaping device or the axes of the energy degrading units of the ridge filter may deviate from the corresponding beam axes. The density of the material may not be uniform throughout the volume of the device and air bubbles can be present in the bulk of the device, surface of the beam shaping device designed as flat bases may come out warped or curved from the 3D-printer.

Depending on their magnitude, these printing errors may result in a dose distribution differing from the planned dose distribution that the TPS attempts to achieve. For example, Monte Carlo simulations have shown that the deviation between the nominal width or height of a tower and the printed width or height should be less than 1 mm to avoid a significant deviation of the dose distribution. A quality control procedure is therefore required after the beam shaping device is manufactured to identify and quantify the defects in the manufacturing process and to quantify the deformation of the dose distribution in the treatment volume that would result from these defects.

One obvious QA process is to install the beam shaping device(s) on the nozzle and to deliver the treatment plan with the treatment machine and to measure the 3D dose distribution in a water phantom. The measured 3D dose distribution can be compared with the planned 3D dose distribution (pDD) of the TPS to evaluate the quality of the beam shaping device(s). This method is, however, not optimal because installing the dosimetry equipment and acquiring the data are both time consuming and cumbersome. The time available to make QA measurements in busy proton therapy (PT) centres is limited and the cost of operating the proton beam can be significant. Therefore, a QA method not requiring access to proton beam time would be an advantage in terms of time, availability, and cost. Furthermore, the cause of any mismatch with the planned dose distribution cannot be assessed with this method.

Heng Li et Al. (A CT-based software tool for evaluating range compensator quality in passively scattered proton therapy. Phys. Med. Biol. 55, 6759-6771 (2010)) and Yoon M. et al. [11](Computerized tomography-based quality assurance tool for proton range compensators. Med. Phys. 35, (2008)) disclose alternative approaches based on geometrical comparisons of the surface of the beam shaping device(s). The reference surface is the ideal shape optimized by the TPS which is compared with the surface that is estimated from the CT scan of the beam shaping device(s). These approaches have the advantage of not using beam time in the treatment room, but they also have the limitation that they only consider geometrical deviations from the reference and ignore any effect that non-uniformities of the material density inside the beam shaping device may have on the dose distribution inside the treatment volume.

The problem that the invention proposes to solve is to provide a fast quality assurance method of a beam shaping device, not requiring the use of a beam, and allowing quantitative analysis of the functionalities of the beam shaping device, including beam stopping power, dose distribution in a volume downstream of the beam shaping device, as well as identification of the defects in the beam shaping device in case quantitative analysis of the dose distribution is not satisfactory. These and other advantages of the present invention are described in continuation.

SUMMARY OF THE INVENTION

The present invention is defined in the appended independent claims. Preferred embodiments are defined in the dependent claims. In particular, the present invention concerns a method for assessing a quality of a beam shaping device manufactured according to a planned device design for shaping one or more beams of accelerated particles emitted by a particle accelerator system. The method comprises, (a) establishing with a treatment planning system (TPS) the planned device design of the beam shaping device suitable for shaping one or more beams of accelerated particles to mate a geometry of a treatment volume (V) of tissue comprising tumoral cells, for depositing specific doses ($D_{ij}$) into specific locations within the treatment volume (V) thus defining a planned dose distribution (pDD) satisfying objectives on the dose deposition in the treatment volume set by a physician, (b) manufacturing the beam shaping device according to the planned device design, (c) establishing a CT-scan of the beam shaping device to yield an actual CT-image, (d) determining dimensions and local materials densities from the actual CT-image, (e) extending the actual CT-image to include the treatment volume (V) and preferably one or more of a ridge filter, a range shifter and/or a range compensator) not comprised in the beam shaping device, (f) determining with a dose engine, preferably the same as in the TPS used in step (a), a calculated dose distribution in the treatment volume (V) obtained by virtually irradiating the treatment volume (V) with the one or more beams through a virtual beam shaping device having a geometry and a density defined by the device actual CT-image, (g) comparing the calculated dose distribution (cDD) with a reference dose distribution (rDD).

The reference dose distribution (rDD) can be, a calculated planned dose distribution, (cpDD) obtained by, first creating with the TPS a high-resolution planned device design (11hrd) corresponding to the planned device design but with a higher resolution, matching a resolution of the actual CT-image and, second, determining the calculated planned dose distribution (cpDD) with the dose engine by virtually irradiating the treatment volume (V) with the one or more beams through the high-resolution planned device, or the planned dose distribution (pDD) or a function thereof.

In particular, the reference dose distribution (rDD) can either be, the calculated planned dose distribution (cpDD) as defined supra, and wherein the high-resolution planned device design is created with a voxel size which is equal to a CT-voxel size used for establishing the actual CT-image, with a tolerance of ±20%, preferably of ±10%, or the function of the planned dose distribution (pDD), which is the result of a transformation of the planned dose distribution (pDD), computed at a given spatial resolution and changing the voxel size to match the CT-voxel size with a tolerance of ±20%, preferably of ±10%, preferably using linear or nearest neighbours' interpolation on the planned dose distribution (pDD).

In a preferred embodiment, the CT-scan of the beam shaping device is performed with a CT-voxel size of not more than 0.5 mm, preferably not more than 0.2 mm. The planned device design can be created from the treatment plan (TP) using a TPS, preferably the same TPS as in step (f) defined supra, with a voxel size similar to or smaller than the CT-voxel size.

Comparing the calculated dose distribution (cDD) with the reference dose distribution (rDD) as defined in step (g) supra, can be performed with a gamma-evaluation. In case a gamma value ($\gamma$) lower than or equal to a reference gamma-value ($\gamma r$) is obtained (i.e., $\gamma \leq \gamma r$) in a predefined percentage of the voxels of the reference dose distribution (rDD), the beam shaping device can be considered as in agreement with the planned device design. The gamma value ($\gamma$). is defined as a minimum of the following function, $$\gamma = \min\left( \sqrt{\frac{|d(cDD) - d(rDD)|^2}{DTA^2} + \frac{|D(cDD) - D(rDD)|^2}{\Delta D^2}} \right) \quad (1)$$

wherein, |d(cDD) −d(rDD)| is a distance between analyzed points; |D(cDD) −D(rDD)| are dose differences, DTA and ΔD are scaling factors.

In case the gamma value ($\gamma$) is higher than the reference gamma-value ($\gamma r$) (i.e., $\gamma > \gamma r$) in a predefined number of voxels in the reference dose distribution (rDD), the beam shaping device is rejected and the dimensions and local materials densities determined from the actual CT-image can be compared with the planned device design or with the calculated high-resolution planned device design as defined supra, to identify deviations of the dimensions and local materials densities of the beam shaping device from the planned device design. In case, one or more deviations are identified, the method can comprise investigating possible manufacturing parameters causing the one or more deviations, and amending the manufacturing parameters accordingly, and no deviation is identified, the method can comprise repeating step (a) as defined supra and establishing an alternative planned device design of the beam shaping device.

The actual CT-image of the device obtained by the CT-scan of the beam shaping device is preferably in the form of a grayscale image characterized by CT Hounsfield units (HU). The local materials densities can thus be determined by transforming the HU into corresponding densities.

The beam shaping device can be produced by 3D-printing or machining in a material selected among a polymer, or a metal or any combination thereof.

The beam shaping device can be a ridge filter comprising a set of energy degrading units, wherein each energy degrading unit is configured for reducing an initial energy (E0) of a corresponding beam of charged particles to reduced energies (Ei), such that doses are deposited into the treatment volume (V) according to the planned dose distribution (pDD). For example, the energy degrading units can be in a form of either, orifices arranged side-by-side in a support base of thickness measured along a beam axis (X), each orifice extending from an aperture opening at a surface of the support base and penetrating to a given depth measured along the beam axes (X), or pins arranged side-by-side and supported on the support base, each pin extending from the support base along the beam axes (X).

In a preferred embodiment, the energy degrading units are formed by one or more degrading subunits.

BRIEF DESCRIPTION OF THE FIGURES

For a fuller understanding of the nature of the present invention, reference is made to the following detailed description taken in conjunction with the accompanying drawings in which.

DETAILED DESCRIPTION OF THE INVENTION

Figure 1A:
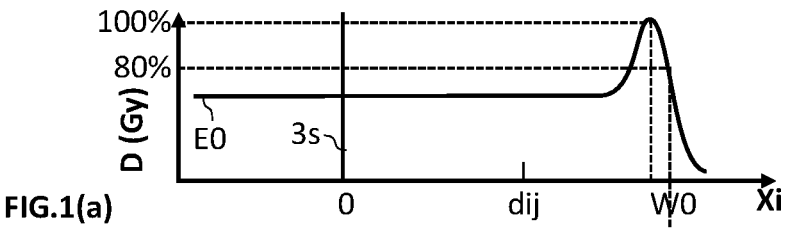
FIG. 1(a): shows the depth dose profile of a typical Bragg peak of a beam of given energy. The abscissa axis represents the depth in water. The maximum beam range (W0) in water is defined as the depth beyond the maximum of the Bragg peak and corresponding to an energy equal to 80% of the maximum of the Bragg peak, wherein W0 must be at least equal to or larger than dij (dij<W0).

The present invention concerns a method for assessing a quality of a beam shaping device (11) manufactured according to a planned device design (11d). The beam shaping device is used to shape one or more beams (100.i) of accelerated particles emitted by a particle accelerator system. A beam shaping device (11) is a device positioned between a source of accelerated particles and a treatment volume in the nozzle of the particle accelerator, changing the energy and the fluence profile as well as the geometry of the beam. The beam shaping device (11) can be for example a ridge filter (11f), a range compensator (11c), a range shifter (11s), or a combination of two or more of the foregoing. If the beam shaping device comprises a combination of two or more of the foregoing devices, they can be in the form of separate modules arranged in series along the irradiation axis (Xi) or, alternatively, they can be integrated in a single device. For example, a base of the ridge filter can form a range shifter. In the following, the invention is described relative to a ridge filter (11f) alone, for sake of clarity, and because a ridge filter has a more complex geometry than a range shifter. The method comprises the following steps.

First, the planned device design (11d) of the beam shaping device (11) is established with a treatment planning system (TPS). The planned device design (11d) must be suitable for shaping one or more beams (100.i) of accelerated particles to mate a geometry of a treatment volume (V) of tissue comprising tumoral cells (3t), for depositing specific doses (Dij) into specific locations within the treatment volume (V) thus defining a planned dose distribution (pDD) satisfying objectives on the dose deposition in the treatment volume and surrounding healthy tissues set by a physician. A CT-image (CT-V) of the patient is acquired and is used by the TPS to compute the planned dose distribution. The voxel size of the CT-image (CT-V) are typically 1 to 3 mm.

A beam shaping device (11) is manufactured according to the planned device design (11d). For example, the beam shaping device (11) can be produced by 3D-printing in any suitable material, preferably a polymer or a combination of polymers. A CT-scan of the beam shaping device (11) is established to yield an actual CT-image (11a) of the beam shaping device (11). The resolution of the voxels of the CT-image (11a) is chosen so as to correctly resolve the smallest geometric features of the beam shaping device (11). The dimensions and local materials densities are determined from the actual CT-image (11a).

The gist of the present invention rests on the calculation of a calculated dose distribution in the treatment volume (V) obtained by virtually irradiating the treatment volume (V) using the beam shaping device (11) according to the actual CT-image (11a). To this purpose, the method comprises the following steps.

The actual CT-image (11a) is extended to include the treatment volume (V). The CT-V is interpolated and inserted into the extended CT-image (11a). The interpolation is required in case the voxel size of CT-V is different from that of the CT-image (11a). In case the particle accelerator system comprises one or more additional beam shaping devices selected among a ridge filter (110, a range shifter (11s) and/or a range compensator (11c) not comprised in the beam shaping device (11) according to the planned device design (11d), then the actual CT-image (11a) is extended to include the corresponding additional beam shaping devices.

A dose engine, preferably the same as in the TPS used in step (a) of the present method, is used to determine a calculated dose distribution in the treatment volume (V) obtained by virtually irradiating the treatment volume (V) with the one or more beams through a virtual beam shaping device having a geometry and a density defined by the device actual CT-image (11a) (including any additional beam shaping device present in the particle accelerator system).

The "dose engine" is an algorithm that computes the dose distribution from a description of the geometry and the beam properties. There are different types of dose engines. Monte-Carlo dose engines are often used in the art.

At this stage, the calculated dose distribution (cDD) can be compared with a reference dose distribution (rDD) to assess the quality of the manufactured beam shaping device (11). The comparison of the calculated dose distribution (cDD) with the reference dose distribution (rDD) is much more instructive than merely comparing the planned device design (11d) with the actual CT-image (11a), as discrepancies between the planned device design (11d) and the actual CT-image (11a) do not necessarily lead to unacceptable deviations from the treatment plan. Such comparison gives the specific information on whether the beam shaping device (11) as manufactured is suitable for carrying out the treatment according to the treatment plan. If the comparison reveals that it is not suitable, it can be possible to understand why by comparing the planned device design (11d) with the actual CT-image (11a).

Reference Dose Distribution (rDD)

In one embodiment, the reference dose distribution (rDD) is a calculated planned dose distribution, (cpDD) obtained by, first creating with the TPS a high-resolution planned device design (11hrd) corresponding to the planned device design (11d) but with a higher resolution, matching a resolution of the actual CT-image and, Second, determining with the dose engine the calculated planned dose distribution (cpDD) by virtually irradiating the treatment volume (V) with the one or more planned pencil beams (in PBS) or with one large beam (in double scattering) through the high-resolution planned device (11hrd)

For example, the high-resolution planned device design (11hrd) can be created with a voxel size which is equal to a CT-voxel size used in the actual CT-image, with a tolerance of 20%, preferably of ±10%. This way, the resolutions of the high-resolution planned device design (11hrd) and of the actual CT-image (11a) have comparable resolutions yielding comparable calculations of the dose distributions.

In an alternative embodiment, the reference dose distribution (rDD) is the planned dose distribution (pDD) or a function thereof. The function of the planned dose distribution (pDD), can be the result of a transformation of the planned dose distribution (pDD), computed at a given spatial resolution and changing the voxel size to match the CT-voxel size with a tolerance of ±20%, preferably of ±10%, preferably using linear or nearest neighbours' interpolation on the planned dose distribution (pDD). This way, the thus obtained dose distributions pDD and cDD can be compared with similar resolutions.

Typically, the CT-scan of the beam shaping device (11) can be performed with a CT-voxel size of not more than 0.5 mm, preferably not more than 0.2 mm. By comparison, usually, the planned device design (11d) is created from the treatment plan (TP) using a TPS, with a voxel size similar to or smaller than the CT-V voxel size. The voxel size for establishing the planned device design (11d) can be of the order of 1.0 mm or smaller.

There can therefore be a resolution ratio of 1 to 5 between the actual CT-image (11a) and the planned device design (11d). With resolution ratios of that magnitude, it is preferred to reduce the resolution ratio by any one of the foregoing embodiments to yield a reference dose distribution (rDD) which is more directly comparable with the calculated dose distribution (cDD).

The actual CT-image (11a) of the device obtained by the CT-scan of the manufactured beam shaping device (11) is preferably in the form of a grayscale image characterized by CT Hounsfield units (HU). The local material densities can be determined by transforming the HU into corresponding densities.

With a Monte Carlo dose engine, it is possible to tally the dose deposited by the simulated protons on a voxel grid with a different size than the extended CT-image (11a). So while the proton trajectories through the beam shaping device (11) are properly described in the high resolution extended CT-image (11a), the dose distribution is tallied on a lower resolution map in order to reduce memory usage and improve the signal to noise statistics of the Monte Carlo simulation. The calculated dose distribution (cDD) and the reference dose distribution (rDD) can therefore have larger voxels than the extended CT-image (11a).

Quality Assessment of a Beam Shaping Device (11)

The method of the present invention includes the step of comparing the calculated dose distribution (cDD) with a reference dose distribution (rDD), the latter being defined as described supra. In a preferred embodiment, comparing the calculated dose distribution (cDD) with the reference dose distribution (rDD) is performed with a gamma-evaluation. In case a gamma value ($\gamma$) lower than or equal to a reference gamma-value ($\gamma r$) is obtained (i.e., $\gamma \leq \gamma r$) in a predefined percentage of the voxels of the reference dose distribution (rDD), the beam shaping device (11) is considered as in agreement with the planned device design (11d). The gamma value ($\gamma$) is defined as a minimum of the following function, $$\gamma = \min\left(\sqrt{\frac{|d(cDD) - d(rDD)|^2}{DTA^2} + \frac{|D(cDD) - D(rDD)|^2}{\Delta D^2}}\right) \quad (1)$$

wherein, $|d(cDD) - d(rDD)|$ is the distance between the analyzed point and the closest point with the same dose in the reference image; $|D(cDD) - D(rDD)|$ is a dose difference of the same point in the two images, DTA and $\Delta D$ are scaling factors. For example, if $\gamma r=1$, the predefined percentage of voxels that satisfy this criterion $\gamma \leq \gamma r$ can be 90%, preferably 95%. The scaling factors can be, for example, DTA=3 mm and $\Delta D=3\%$.

In case the gamma value ($\gamma$) is higher than the reference gamma-value ($\gamma r$) (i.e., $\gamma > \gamma r$) in a predefined percentage of voxels, the beam shaping device (11) is rejected. The dimensions and local materials densities of the beam shaping device can be determined from the actual CT-image (11a) and compared with the planned device design (11d) or with the calculated high-resolution planned device design (11hrd) as defined supra. Deviations of the dimensions and local materials densities of the beam shaping device (11) from the planned device design (11d) can thus be identified. With experience, possibly with artificial intelligence, different types of deviations can be attributed to a specific effect on the calculated dose distribution (cDD).

In case one or more deviations of the dimensions and/or local materials densities of the beam shaping device (11) from the planned device design (11d) are identified, the method can thus comprise investigating possible manufacturing parameters causing the deviations and amending the manufacturing parameters accordingly. In case no deviation is identified, the method can comprise repeating the step of establishing with a treatment planning system (TPS) an alternative planned device design (11d) of the beam shaping device (11).

Beam Shaping Device (11)

As illustrated in FIGS. 3(a) to 3(e), the beam shaping device (11) can be for example a ridge filter (11f), a range compensator (11c), a range shifter (11s), or a combination of two or more of the foregoing.

Figure 1B:
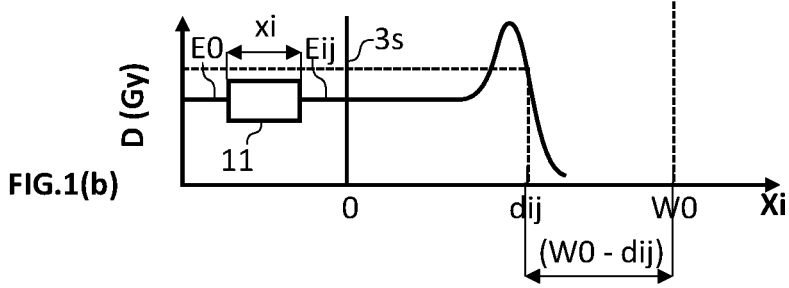
FIG. 1(b) shows the depth dose profile of the Bragg peak of the beam of FIG. 1(a) with an energy degrading unit intersecting the path of the beam.

FIG. 1(a) plots the dose (Dij) deposited as a function of the water equivalent thickness (WET) along a beam axis (Xi) by a beam (100.i) of given energy (E0). The maximum beam range in water (WET) is defined as W0, corresponding to the depth beyond the maximum of the Bragg peak and corresponding to an energy equal to 80% of the maximum of the Bragg peak. This means that the beam (100.i) of given energy cannot penetrate deeper into the tissues than the corresponding water equivalent thickness W0 (i.e., target depth dij$\leq$W0). If the treatment volume (V) extends to a target depth (dij) deeper than the Bragg peak (i.e., dij>W0), then a beam of higher energy must be used. FIG. 1(b) shows the displacement of the Bragg peak upon inserting a beam shaping device (11) or element thereof across the path of the same beam (100.i) of given energy (E0). It can be seen that the WET of the Bragg peak is now at a target depth (dij) smaller than W0 (i.e., dij<W0) from the skin of the patient (3s). This is because a portion (E0–Eij) of the energy of the beam (100.i) is absorbed by the beam shaping device (11) or element thereof the beam must cross. FIG. 1(b) shows how to displace one Bragg peak form a WET=W0 to a target WET=dij by interposing a shaping device (11) or element thereof. Since a SOBP can be formed by superimposing several Bragg peaks distributed over a depth range along the irradiation axis (X), to deposit the required doses (Dij) into a whole subvolume of the treatment volume (V) by PBS with a single energy (or painting) layer or by double scattering, several degrading subunits (11.ij) can be superimposed to form an energy degrading unit (11.i) as shown in FIGS. 3(b) and 3(c), wherein each degrading subunit (11.ij) is dimensioned such as to shift the Bragg peak from WET=W0 to the target depth (dij) to ensure that the required doses (Dij) be deposited in each cell (Cij) of the subvolume irradiated by the beam (100.i). The number of Bragg peaks and their corresponding target depths (dij) required for yielding the desired SOBP according to the TP must be determined, which defines the number of energy degrading units (11.i) and degrading subunits (11.ij) they composed of. The geometries, materials and material densities to be used for the ridge filter (11f) need be determined as well to establish the planned device design (11d).

Range Shifter (11s)

Figure 3A:
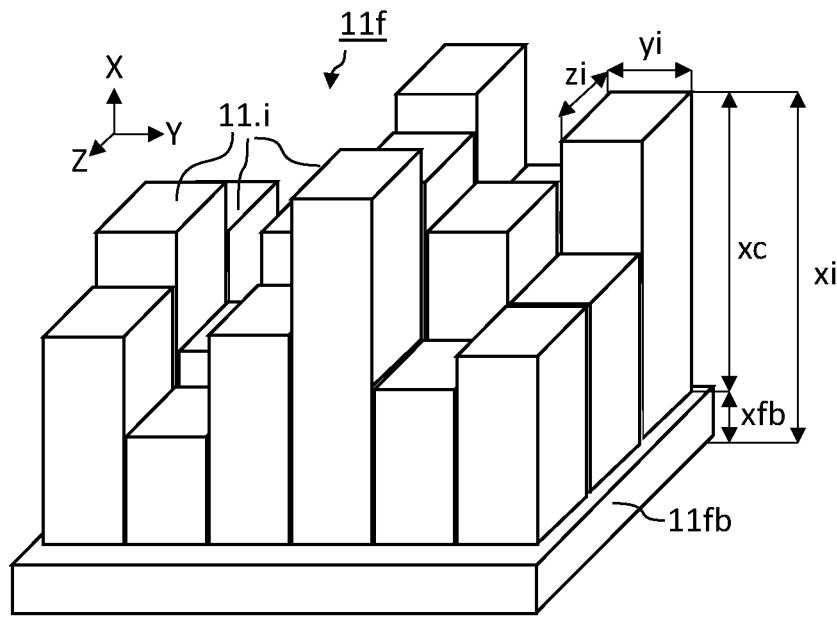
FIGS. 3(a) to 3(c): show three embodiments of ridge filters.
Figure 3B:
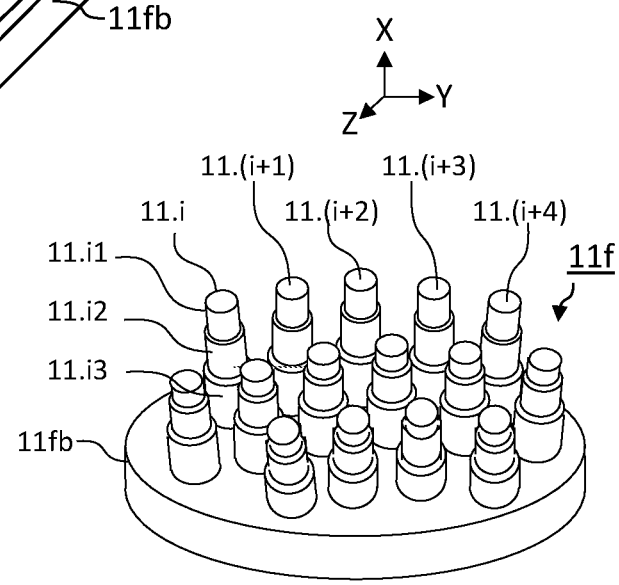
Figure 3C:
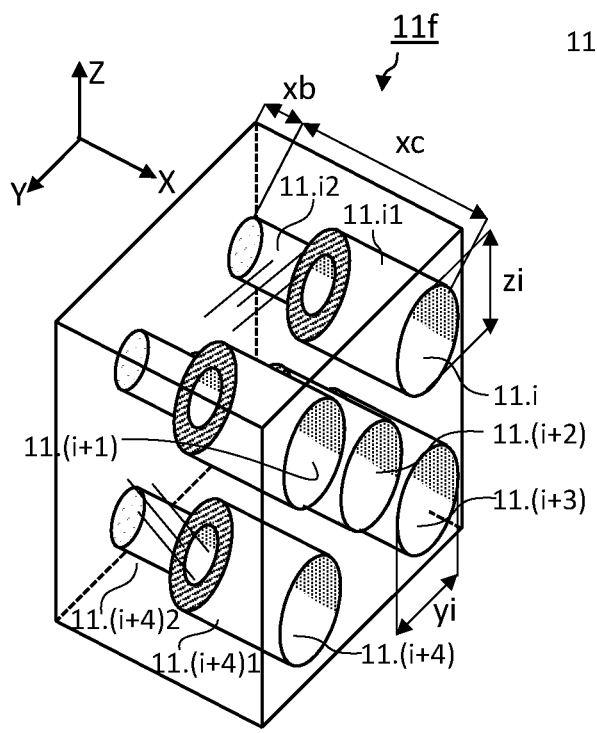
Figure 3D:
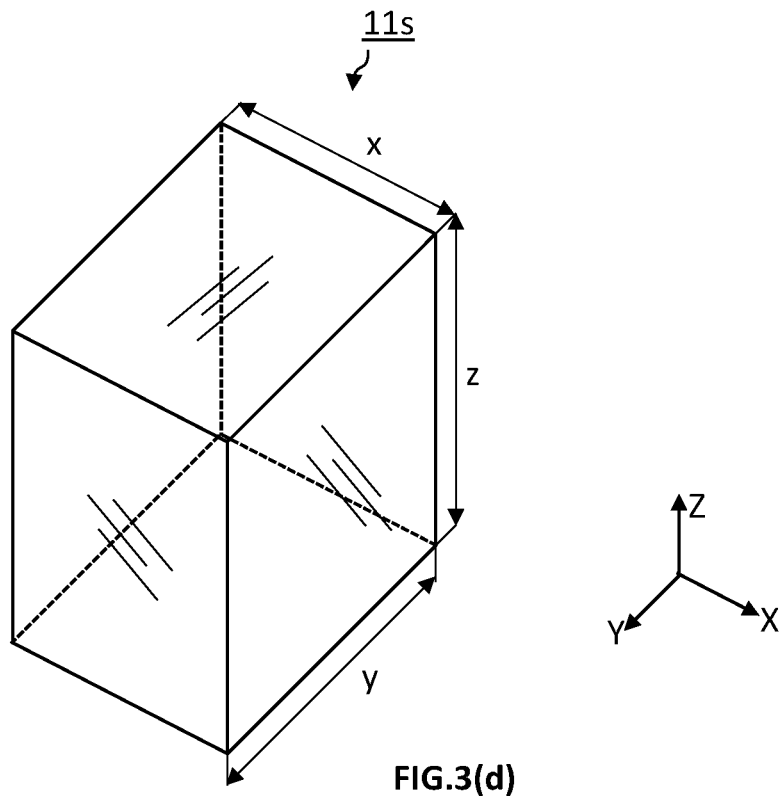
FIG. 3(d) shows an embodiment of a range shifter.

The range shifter (11s) illustrated in FIG. 3(d) generally has a simple parallelepipedal geometry and serves to absorb a controlled fraction of the energy of the beams (100.i) and thus reduce the penetration depth in the body of a patient to match the depth of the treatment volume (V) comprising the tumoural cells. Because of the simple geometry thereof, apart from possible local inhomogeneities of the density of the material depending on the process used to manufacture it, a range shifter (11) generally poses little problems in terms of quality.

Range Compensator (11c)

Figure 3E:
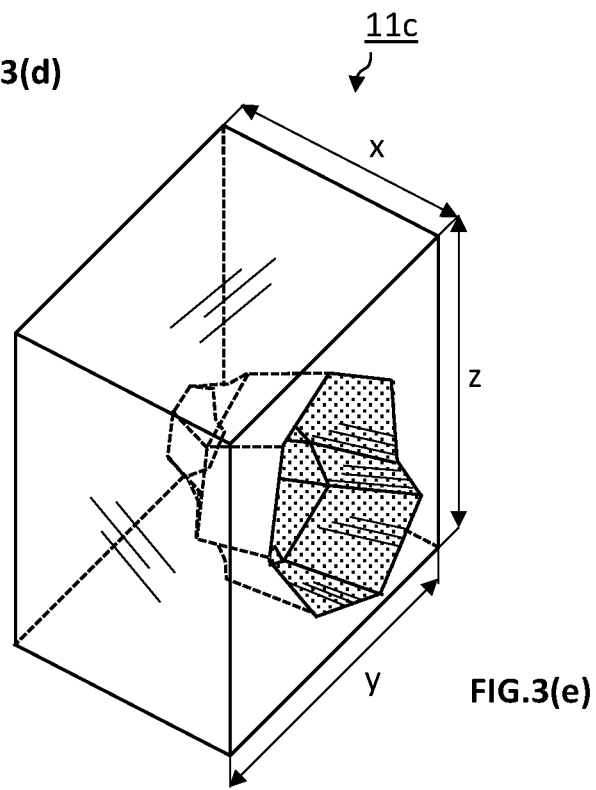
FIG. 3(e) shows an embodiment of a range compensator.

A range compensator (11c) illustrated in FIG. 3(e) is formed by a block comprising a cavity mirroring a distal boundary of the treatment volume (V). The range compensator conforms the dose deposition pattern to the distal edge of the treatment volume (V). The geometry of the range compensator (11c) is more complex than the one of the range shifters (11s) discussed supra. Quality assessment of both geometry and density distribution of the range compensator (11c) is therefore important to guarantee the success of the planned treatment.

Ridge Filter (11f)

FIGS. 3(a) to 3(c) illustrate three different embodiments of ridge filters (11f). They have in common that they all comprise a set of energy degrading units (11.i), wherein each energy degrading unit (11.i) is configured for reducing an initial energy (E0) of a corresponding beam (100.i) of charged particles to reduced energies (Ei) and corresponding number of particles, such that the doses prescribed by a physician are deposited into the treatment volume (V) according to the planned dose distribution (pDD).

Figure 2A:
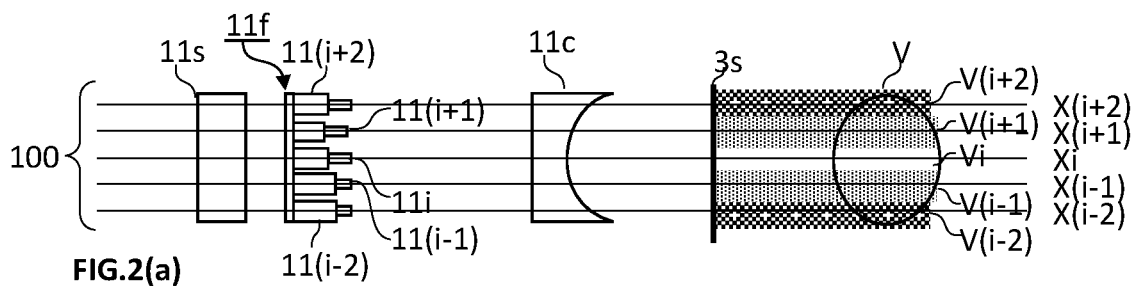
FIG. 2(a) shows beams (100.i, 100.(i+1) . . . ) extending along respective beam axes (Xi, X(i+1) . . . ) parallel to each other and to the irradiation axis (X) passing through beam shaping devices, including a range shifter, a ridge filter, and a range compensator.
Figure 2B:
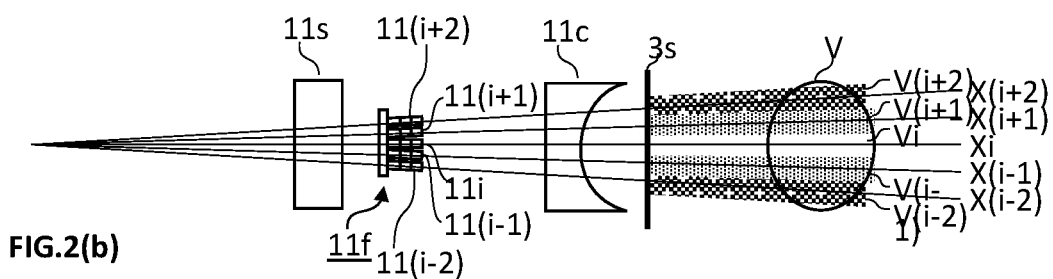
FIG. 2(b) shows beams (100.i, 100.(i+1) . . . ) extending along respective beam axes (Xi, X(i+1) . . . ) fanning out around the irradiation axis (X) passing through a range shifter, a ridge filter and a range compensator.

As shown in FIG. 3(c), the energy degrading units (11.i) can be in a form of orifices arranged side-by-side in a support base (11fb) of thickness (xb) measured along a beam axis (X). Each orifice extends from an aperture opening at a surface of the support base (11fb) and penetrating to a given depth measured along the beam axes (X). Alternatively, as illustrated in FIGS. 3(a) and 3(b), the energy degrading units (11.i) can be in a form of pins arranged side-by-side and supported on the support base (11fb). Each pin extends from the support base along the beam axes (X). All pins can be parallel to a single irradiation axis (X) as illustrated in FIG. 3(a). Alternatively, the pins may be parallel to different irradiation axes (Xi), taking account of an angle between individual beams caused by the scanning of beams in pencil beam scanning (PBS), as shown in FIGS. 2(b) and 2(c).

Figure 2C:
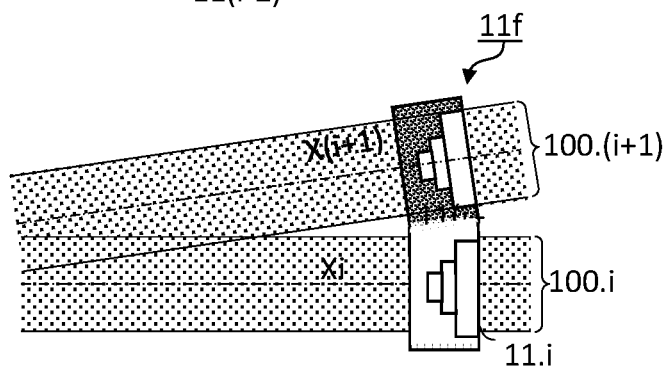
FIG. 2(c) shows two energy degrading units with beams (100.i, 100.(i+1)) extending along respective beam axes (Xi, X(i+1)) which are not parallel to one another ((Xi, X(i+1))-angle exaggerated).

As shown in FIGS. 2(c), 3(b), and 3(c), the energy degrading units (11.i) can be formed by one or more degrading subunits (11.ij). A method for designing a ridge filter with degrading subunits (11.ij). according to a treatment plan is described, e.g., in EP2021/0208699.

The beam shaping device (11) can also be a combination of two or more of a ridge filter (110, a range compensator (11c), a range shifter (11s). The two or more devices can be separate from one another, as shown in FIGS. 2(a) and 2(b). Alternatively, they can be integrated in a single device. For example, a range shifter (11s) can form the support base (11fb) of a ridge filter (110 or be added to a thickness of a range compensator (11c).

Figure 4:
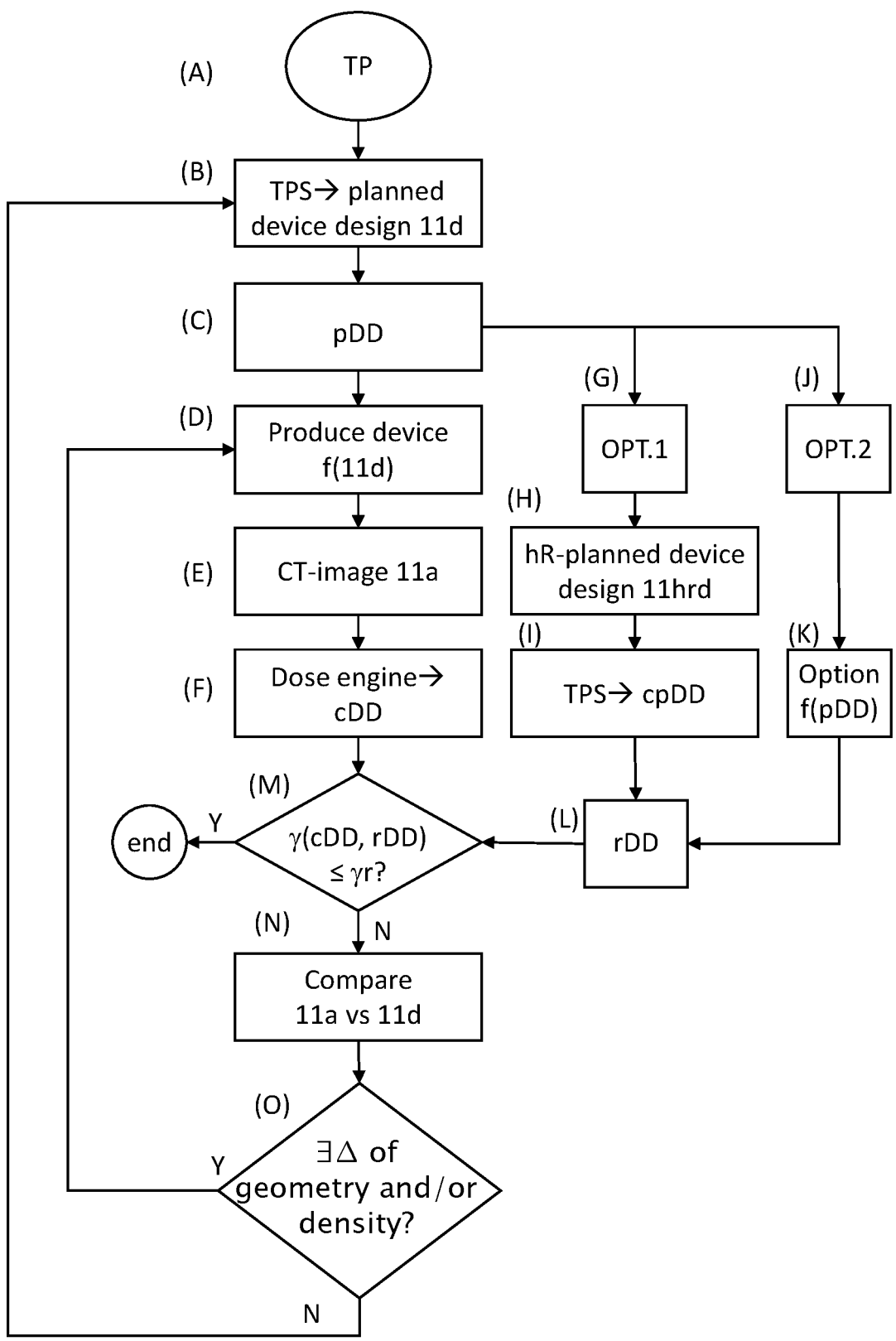
FIG. 4: shows a flowchart illustrating steps of the method of the present invention.

Flowchart of FIG. 4

FIG. 4 shows a flowchart illustrative of the method of the present invention. A treatment plan (TP) is established by a medical practitioner (cf. FIG. 4, (A)). The TP comprises dose objectives to be met at the end of the treatment that are prescribed by a physician. These can include one or more of the following, minimal doses to be deposited into a predefined proportion of a treatment volume or sub-volume comprising tumoural cells, maximal doses not to be exceeded in sub-volume comprising healthy cells, doses to be deposited at a minimal dose deposition rate into a sub-volume comprising both tumoural and healthy cells, and the like.

With a treatment planning system (TPS) a planned device design (11d) is generated in (B). A first resolution is applied, defined by the size of the voxels, to design the geometry and density of the beam shaping device (11). To save computing resources and time, the first resolution can be moderate, of the order of 1 mm per voxel.

In box (C), a planned dose distribution (pDD) is computed, which would result from positioning a beam shaping unit (11) with the planned device design (11d) across the irradiation beam or beams (100.i). A sine qua non condition for the pDD is to meet the requirements defined in the TP.

The beam shaping device (11) can be manufactured according to the planned device design (11d) as indicated in box (D). The beam shaping device can be manufactured by 3D-printing or machining. An actual CT-image (11a) of the thus manufactured beam shaping device (11) is generated in box (E). The actual CT-image (11a) is generally in the form of a grayscale image characterized by CT Hounsfield units (HU), which are representative of the local densities of the materials of the beam shaping device (11).

In box (F) a calculated dose distribution (cDD) is calculated from the actual CT-image (11a) of the beam shaping device. This calculated dose distribution (cDD) is to be compared in box (M) with a reference dose distribution (rDD) defined in box (L). Two alternative routes are proposed as examples for the determination of rDD: Option 1 (=OPT.1) defined in boxes (G) to (I) and (L) and Option 2 (=OPT.2) defined in boxes (J) to (L).

In Option 1, a high-resolution planned device design (11hrd) is created in box (H) with the TPS, which corresponds to the planned device design (11d) but with a higher resolution. The resolution of the actual CT-image is increased via interpolation to the higher CT-resolution of the planned device design. A calculated planned dose distribution (cpDD) is then determined in box (I) by virtually irradiating with the dose engine the treatment volume (V) with the one or more beams through the high-resolution planned beam shaping device (11hrd). The reference dose distribution (rDD) is defined in box (L) as the calculated planned dose distribution (cpDD) (i.e., rDD=cpDD).

In Option 2, if the resolution of the planned device design (11d) is compatible with the resolution of the actual CT-image, the reference dose distribution (rDD) can be defined in box (L) as the planned dose distribution (pDD). If the resolution of the planned device design (11d) is lower than and not compatible with the resolution of the actual CT-image, the reference dose distribution (rDD) can be defined in box (L) as a function (f(pDD)) of the planned dose distribution, which is the result of a transformation of the planned dose distribution (pDD), The calculated dose distribution (cDD) determined in box (F) can be compared with the reference dose distribution (rDD) defined in box (L). Comparing the calculated dose distribution (cDD) with the reference dose distribution (rDD) is preferably performed with a gamma-evaluation, so that in case a gamma value ($\gamma$) lower than or equal to a reference gamma-value ($\gamma r$) is obtained (i.e., $\gamma \leq \gamma r$) in a predefined percentage of the voxels of the reference dose distribution (rDD), the beam shaping device (11) is considered as in agreement with the planned device design (11d), thus successfully ending the quality assessment operation (cf. arrow "Y" leading from box (M) to the box "end"). In case the gamma value ($\gamma$) is not lower than or equal to the reference gamma-value (γr) (i.e., γ>γr) in the predefined percentage of the voxels of the reference dose distribution (rDD), then the actual CT-image (11a) of the device is to be compared in box (N) with the planned device design (11d), in terms of geometry and local densities.

If a mismatch of the geometries and/or densities between the actual CT-image (11a) and the planned device design (11d) is identified which can be attributed to the manufacturing of the beam shaping device (11), then a new beam shaping device (11d) can be manufactured with different process parameters to decrease, preferably eliminate the mismatches thus identified (cf. arrow "Y" running from box (O) to box (D)). If, on the other hand, no mismatch can be identified, or if mismatches are identified which cannot be corrected in the manufacturing process, then a new planned device design (11d) could be established. For example, a ridge filter (11f) originally designed with pins such as illustrated in FIGS. 3(a) and 3(b) could result difficult to produce with the required accuracy (e.g., long and/or thin pins). A corresponding ridge filter (11f) could be designed with orifices instead of pins, as illustrated in FIG. 3(c), which could possibly be manufactured without defects.

The present method is very advantageous for the following reasons,

It requires no use at all of a particle accelerator system, whose schedules are generally very tight and whose use is expensive in terms of energy, It can be applied to any type of beam shaping device (11), It compares the calculated dose distribution (cDD) with the reference dose distribution (rDD), which is a direct information on the suitability of a beam shaping device (11) for delivering the treatment plan, Mismatches of the geometries and/or densities between the actual CT-image (11a) and the planned device design (11d) are only analysed in case the calculated dose distribution (cDD) differs from the reference dose distribution (rDD) by more than a predefined level (e.g., gamma, evaluation), In many cases, it allows assigning given mismatches of the geometries and/or densities between the actual CT-image (11a) and the planned device design (11d) to corresponding mismatches between the calculated dose distribution (cDD) and the reference dose distribution (rDD), which can then be implemented in new processing conditions to eliminate the latter mismatches, In some cases, it can teach that a planned device design (11d) cannot be manufactured easily, and an alternative planned device design may be advantageous.

| REF | DESCRIPTION |
|---|---|
| 3s | Skin of a patient |
| 11 | Beam shaping device |
| 11.i | Energy degrading unit |
| 11.ij | Degrading subunit |
| 11a | Actual CT-image |
| 11c | Range compensator |
| 11d | Planned device design |
| 11f | Ridge filter |
| 11fb | Support base |
| 11hrd | High resolution planned device design |
| 11s | Range shifter |
| 100 | Beam |
| 100.i | Beam |
| cDD | Calculated dose distribution |
| cpDD | Calculated planned dose distribution |
| dij | Target depth |
| E0 | Initial energy of the beam |
| Eij | Beam energy after passing a beam shaping device or element thereof |
| pDD | Planned dose distribution |
| rDD | Reference dose distribution |
| TP | Treatment plan |
| TPS | Treatment planning system |
| W0 | Maximum beam range |
| X, Y, Z | Space coordinates |
| x, y, z | Dimensions of the beam shaping device along the axes X, Y, Z |
| xc | Height of a pin along the axis X |
| xfb | Thickness of the support base of a ridge filter along the axis X |
| xi, yi, zi | Dimensions of the energy degrading units of a ridge filter along the axes X, Y, Z |

The invention claimed is:

1. A method for assessing a quality of a beam shaping device manufactured according to a planned device design for shaping one or more beams of accelerated particles emitted by a particle accelerator system, the method comprising,
   (a) establishing with a treatment planning system (TPS) the planned device design of the beam shaping device suitable for shaping one or more beams of accelerated particles to mate a geometry of a treatment volume (V) of tissue comprising tumoral cells, for depositing specific doses (Dij) into specific locations within the treatment volume (V) thus defining a planned dose distribution (pDD) satisfying objectives on the dose deposition in the treatment volume set by a physician,
   (b) manufacturing the beam shaping device according to the planned device design,
   (c) establishing a CT-scan of the beam shaping device to yield an actual CT-image,
   (d) determining dimensions and local materials densities from the actual CT-image,
   (e) extending the actual CT-image to include the treatment volume (V),
   (f) determining with a dose engine a calculated dose distribution in the treatment volume (V) obtained by virtually irradiating the treatment volume (V) with the one or more beams through a virtual beam shaping device having a geometry and a density defined by the device actual CT-image, and
   (g) comparing the calculated dose distribution (cDD) with a reference dose distribution (rDD).

2. The method according to claim 1, wherein the reference dose distribution (rDD) is,
   a calculated planned dose distribution, (cpDD) obtained by,
      first creating with the TPS a high-resolution planned device design corresponding to the planned device design but with a higher resolution, matching a resolution of the actual CT-image and,
      second, determining the calculated planned dose distribution (cpDD) with the dose engine by virtually irradiating the treatment volume (V) with the one or more beams through the high-resolution planned device, or
   the planned dose distribution (pDD) or a function thereof.

3. The method according to claim 2, wherein the reference dose distribution (rDD) is either,
   the calculated planned dose distribution (cpDD), and wherein the high-resolution planned device design is created with a voxel size which is equal to a CT-voxel size used for establishing the actual CT-image, with a tolerance of ±20%, or the function of the planned dose distribution (pDD), which is the result of a transformation of the planned dose distribution (pDD), computed at a given spatial resolution and changing the voxel size to match the CT-voxel size with a tolerance of ±20%.

4. The method according to claim 1, wherein the CT-scan of the beam shaping device is performed with a CT-voxel size of not more than 0.5 mm.

5. The method according to claim 4, wherein the planned device design is created from the treatment plan (TP) using a TPS with a voxel size similar to or smaller than the CT-voxel size.

6. The method according to claim 1, wherein comparing the calculated dose distribution (cDD) with the reference dose distribution (rDD) is performed with a gamma-evaluation and wherein in case a gamma value ($\gamma$) lower than or equal to a reference gamma-value ($\gamma r$) is obtained in a predefined percentage of the voxels of the reference dose distribution (rDD), the beam shaping device is considered as in agreement with the planned device design, wherein $\gamma$ is defined as a minimum of the following function, $$\gamma = \min\left(\sqrt{\frac{|d(cDD) - d(rDD)|^2}{DTA^2} + \frac{|D(cDD) - D(rDD)|^2}{\Delta D^2}}\right) \quad (1)$$

wherein, |d(cDD) −d(rDD)| is a distance between analyzed points, |D(cDD) −D(rDD) | are dose differences, and DTA and AD are scaling factors.

7. The method according to claim 6, wherein in case the gamma value ($\gamma$) is higher than the reference gamma-value ($\gamma r$) in a predefined number of voxels in the reference dose distribution (rDD), the beam shaping device is rejected and the dimensions and local materials densities determined from the actual CT-image are compared with the planned device design or with a calculated planned dose distribution, (cpDD) obtained by,
first creating with the TPS a high-resolution planned device design corresponding to the planned device design but with a higher resolution, matching a resolution of the actual CT-image and,
second, determining the calculated planned dose distribution (cpDD) with the dose engine by virtually irradiating the treatment volume (V) with the one or more beams through the high-resolution planned device,
to identify deviations of the dimensions and local materials densities of the beam shaping device from the planned device design.

8. The method according to claim 7, wherein in case,
one or more deviations are identified, the method comprises investigating possible manufacturing parameters causing the one or more deviations, and amending the manufacturing parameters accordingly, and
no deviation is identified, the method comprises repeating the step of establishing with a treatment planning system (TPS) the planned device design of the beam shaping device suitable for shaping one or more beams of accelerated particles to mate a geometry of a treatment volume (V) of tissue comprising tumoral cells, for depositing specific doses (Dij) into specific locations within the treatment volume (V) thus defining a planned dose distribution (pDD) satisfying objectives on the dose deposition in the treatment volume set by a physician and establishing an alternative planned device design of the beam shaping device.

9. The method according to claim 1, wherein the actual CT-image of the device obtained by the CT-scan of the beam shaping device is in the form of a grayscale image characterized by CT Hounsfield units (HU), and wherein the local materials densities are determined by transforming the HU into corresponding densities.

10. The method according to claim 1, wherein the beam shaping device is produced by 3D-printing or machining in a material selected from a polymer, a metal, and any combination thereof.

11. The method according to claim 1, wherein the beam shaping device is a ridge filter comprising a set of energy degrading units, wherein each energy degrading unit is configured for reducing an initial energy ($E0$) of a corresponding beam of charged particles to reduced energies ($Ei$), such that doses are deposited into the treatment volume (V) according to the planned dose distribution (pDD).

12. The method according to claim 11, wherein the energy degrading units are in a form of either,
orifices arranged side-by-side in a support base of thickness (xb) measured along a beam axis (X), each orifice extending from an aperture opening at a surface of the support base and penetrating to a given depth measured along the beam axes (X), or
pins arranged side-by-side and supported on the support base, each pin extending from the support base along the beam axes (X).

13. The method according to claim 12, wherein the energy degrading units are formed by one or more degrading subunits.

* * * * *

UNITED STATES PATENT AND TRADEMARK OFFICE
CERTIFICATE OF CORRECTION

PATENT NO. : 12,442,780 B2
APPLICATION NO. : 18/454259
DATED : October 14, 2025
INVENTOR(S) : Lucian Hotoiu et al.

Page 1 of 1

It is certified that error appears in the above-identified patent and that said Letters Patent is hereby corrected as shown below:

On the Title Page

Item (71) Applicants: "Ion Beam Applications, Louvain-la-neuve (BE); The Trustees of the University of Pennsylvania, Philadelphia, PA (US)" should read -- Ion Beam Applications, Louvain-la-Neuve (BE); The Trustees of the University of Pennsylvania, Philadelphia, PA (US) --

Item (73) Assignee: "ION BEAM APPLICATIONS, Louvain-la-Neuve (BE)" should read -- ION BEAM APPLICATIONS, Louvain-la-Neuve (BE); THE TRUSTEES OF THE UNIVERSITY OF PENNSYLVANIA, Philadelphia, PA (US) --

Item (74) Attorney, Agent, or Firm: "Finnegan, Henderson, Parabow, Garrett & Dunner LLP" should read -- Finnegan, Henderson, Farabow, Garrett & Dunner, LLP --

In the Claims

In Claim 6, Column 15, Lines 29-30, "DTA and AD are scaling factors" should read -- DTA and $\Delta$D are scaling factors --

Signed and Sealed this
Twenty-seventh Day of January, 2026

John A. Squires
*Director of the United States Patent and Trademark Office*